UNITED STATES PATENT OFFICE.

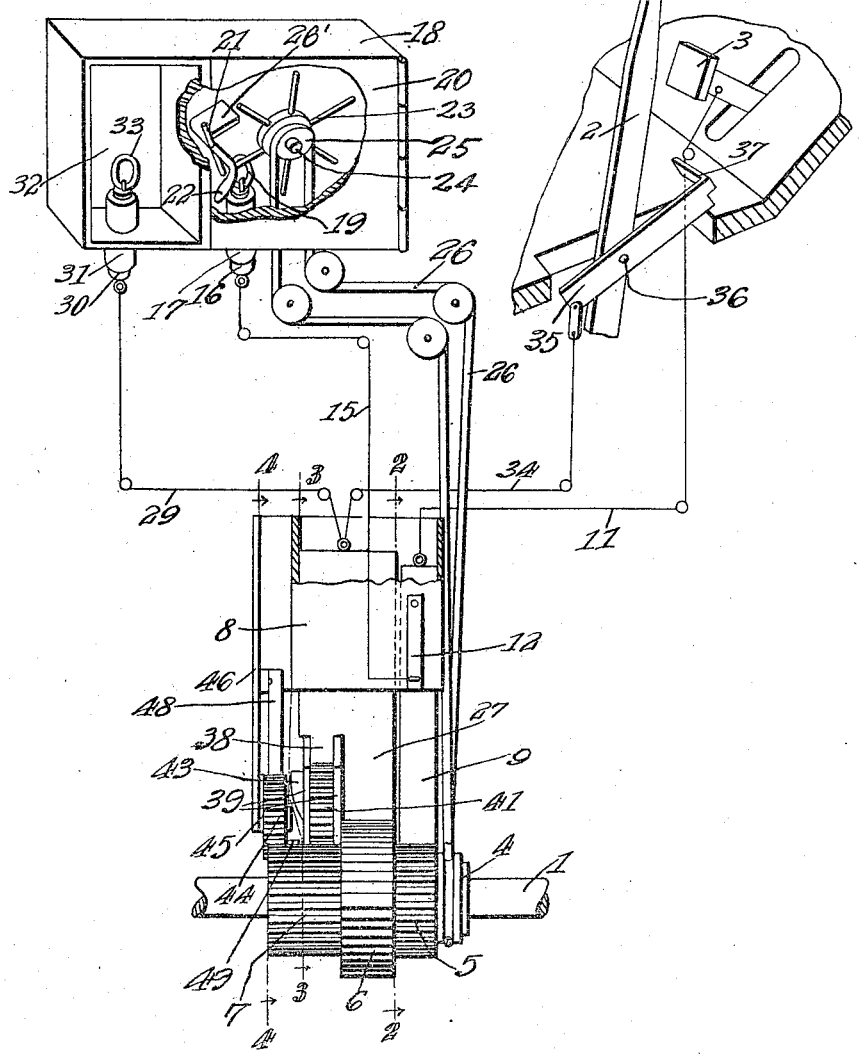

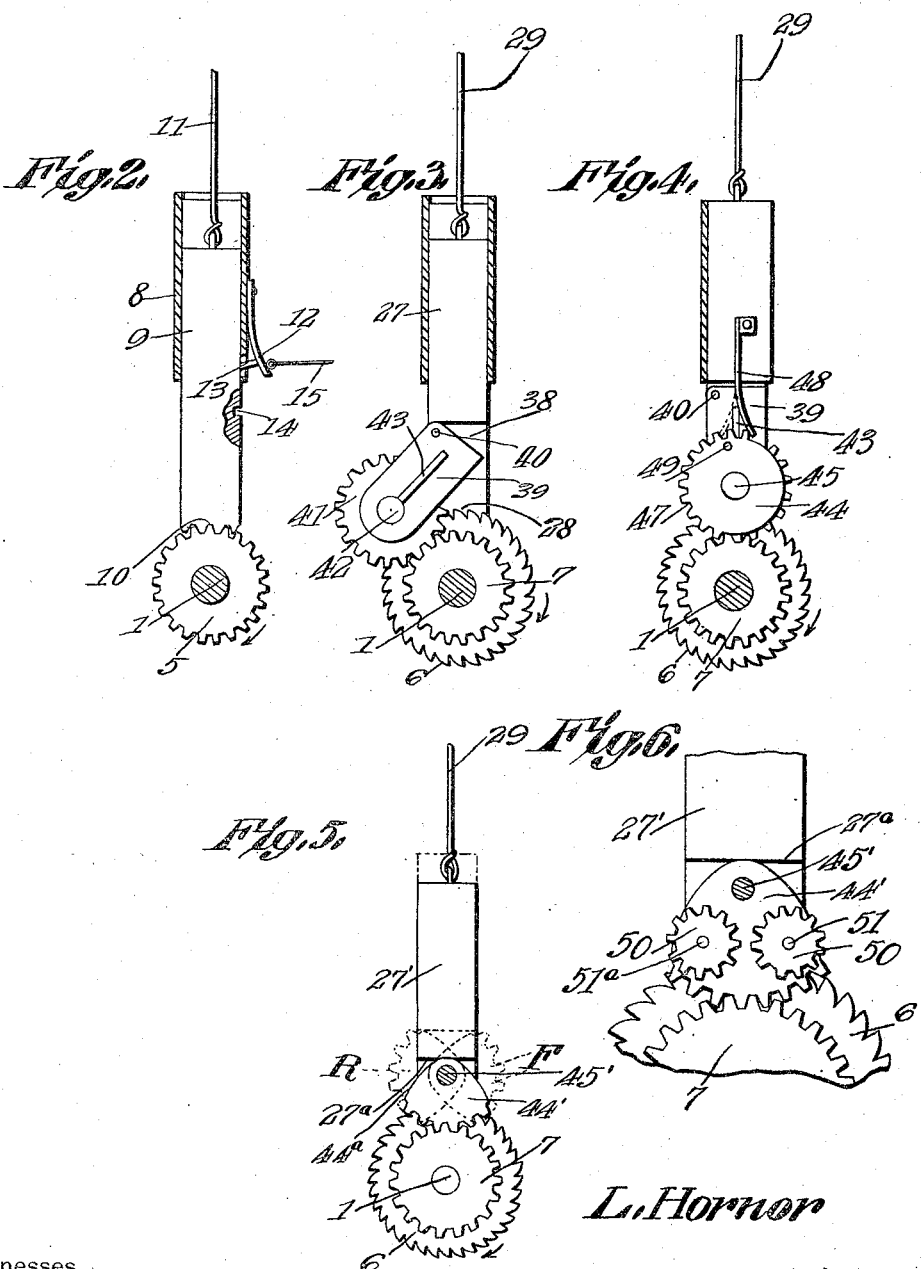

LEVI HORNOR, OF WICHITA, KANSAS.

AUTOMATIC SAFETY-STOP FOR AUTOMOBILES.

1,276,921.   Specification of Letters Patent.   Patented Aug. 27, 1918.

Application filed September 26, 1917. Serial No. 193,317.

*To all whom it may concern:*

Be it known that I, LEVI HORNOR, a citizen of the United States, residing at Wichita, in the county of Sedgwick and State of Kansas, have invented a new and useful Automatic Safety-Stop for Automobiles, of which the following is a specification.

The present invention relates to an automatic safety stop for automobiles, and is particularly an improvement over the back stop brake for automobiles disclosed in my Patent No. 1,203,876, dated November 7, 1916.

The invention has for its object the provision of a novel and improved mechanism for automatically preventing the backward movement of the automobile, except when the operator moves the gear shifting lever of the automobile to reverse position, or otherwise releases the back stop device. Thus, should the motor of the automobile be accidentally "killed" while ascending a hill, or the operator intentionally stop the motor or release the clutch of the automobile, said back stop device would automatically prevent the automobile from backing down the hill by force of gravity.

A further object of the invention is to improve the back stop brake for automobiles disclosed in said patent so that if the driver while backing down a hill should release the clutch or move the gear shifting lever of the automobile from the reverse position, the back stop device would not act to stop the backward movement of the automobile, but would act again only after the automobile had been stopped by other means, and had been run forward, thus automatically preventing the back stop from being applied while the machine is running backward.

A further object of the invention is the provision of a dog or other means of preventing an automobile from moving in either direction when standing, said means being releasable by the action of the clutch pedal or other operating member of the automobile while preparing to start the automobile, and means of preventing said device from being applied to stop the automobile when in motion.

The mechanism also has improved features of construction and details to enhance the utility and efficiency of said back stop brake.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:

Figure 1 is a diagrammatical view of the mechanism.

Figs. 2, 3 and 4 are sectional details on the respective lines 2—2, 3—3 and 4—4 of Fig. 1.

Figs. 5 and 6 are detail views illustrating modifications.

In the drawings, 1 designates a shaft or other rotary member connected to one or both the rear or propeller wheels of an automobile, which shaft or other member necessarily rotates when the automobile runs either backward or forward, whether propelled by the motor or other force, and the numerals 2 and 3 designate the gear shift lever and clutch pedal, respectively, of the automobile.

In carrying out the invention, there are secured upon the shaft or rotary member 1 a pulley 4, toothed clutch member 5, ratchet wheel 6, and gear 7 to rotate with said rotary member, and a casing or guide 8 is located above said rotary member 1, and a dog 9 is slidable in said casing, being gravity operated as illustrated, although it may be spring pressed if desired. One end of the dog 9 has teeth 10 to engage the teeth of the clutch member 5, whereby to lock the rotary member 1 and the automobile against movement in either direction. A cord or other flexible element 11 is connected to the dog 9 and clutch pedal 3 or other operating member, said cord being guided over suitable pulleys or guides, whereby when the clutch pedal 3 is depressed preparatory to starting the automobile, the dog 9 is raised to release the rotary member 1.

As a means of holding the dog 9 retracted during the movement of the automobile, a leaf spring catch 12 is secured to a casing 8 and has a pin 13 working in an aperture in said casing to snap into a notch 14 in the dog 9, thereby holding said dog 9 retracted, the casing 8 being below the floor of the automobile, so that the catch can not be operated directly. A cord or flexible element 15 is connected to the catch 12, passed over suitable guides or pulleys, and attached to a plunger 16 slidable in a guide 17 within the bottom of a casing 18 within convenient reach of the operator, the plunger 16 having a finger ring or handle 19 at its upper end within the casing. The casing has a door 20 provided with a suitable latch 21, said latch has a handle 22 on the outside of the door for the purpose of turning said latch 21 to open the door 20 in order that access may be had to the handle 19 for pulling the cord 15 to release the catch 12, thus permitting the dog 9 to drop to engagement with the clutch member 5 and hold the rotary member 1 and the automobile against movement in either direction. The cord 15 is concealed so that it can not be pulled in any other way than that described above. In order to prevent the release of the catch 12 when the automobile is in motion, there is provided a star wheel 23, mounted on a shaft 24 supported in any suitable manner within the casing 18 (or in any other suitable location) having a pulley 25 connected by a belt 26 with the pulley 4, so that the star wheel 23 will be rotated when the automobile is in motion. The arms of the star wheel 23 in rotation strike a wing 26' of the latch 21 and swing it and the handle 22 in one direction or the other, thus holding the latch 21 in engagement with the casing and preventing the operator from opening the door 20. Should the door be left open by mistake, the rotating arms of the star wheel 23 would strike the fingers of the operator, thus preventing him from pulling the handle 19, said arms rotating in front of said handle 19. Thus it is impossible to drop the dog 9 when the autmobile is in motion, but this is easily done when the car is still.

The mechanism also embodies means for automatically preventing the backward movement of the automobile except when the shifting lever 2 is in the reverse position, when the mechanism constituting such means has been otherwise released, or while the automobile is still moving backward after the shifting lever 2 has been withdrawn from the reverse position while the autmobile was running backward. For this purpose, a ratchet dog 27 is slidable within the casing 8 and is provided at one end with ratchet teeth 28 to engage the ratchet teeth of wheel 6 and stop the backward movement of the rotary member 1 when just starting to rotate backward, thus stopping the automobile. The dog 27 like the dog 9, also drops by gravity (aided if necessary by a spring) to engagement with the ratchet wheel 6, when the rotary member 1 starts backward. The dog 27 is connected by a cord or flexible element 29 (over suitably located pulleys or guides) with a plunger 30 slidable through a guide 31 in the bottom of an open compartment 32 of the casing 18, said plunger having a finger ring or handle 33 whereby the cord 29 can be conveniently pulled at any time to raise the dog 27, thus holding dog 27 out of engagement with the teeth on ratchet wheel 6 when the automobile is being run backward. Another cord or flexible element 34 (passed over suitable guides or pulleys) connects the dog 27 with a lever 35 fulcrumed, as at 36, adjacent to the gear shift lever 2, and said lever 35 has a lug or finger 37 whereby to engage the gear shift lever 2 when said lever is moved to reverse position for backing up the automobile. Thus, when the operator starts to prepare to back up, the gear shift lever 2 in being moved to reverse position will contact with lug 37 and swing lever 35 to pull cord 34 and raise dog 27 preventing it from dropping and engaging ratchet wheel 6, leaving said ratchet wheel 6 free to move with the rotary member 1.

As a means of holding dog 27 above ratchet wheel 6 when the automobile is moving forward, the dog 27 is provided with a raised depending lug 38 at one side overlapped by pendent plates 39 which are pivoted to said lug, as at 40, to swing transversely of the rotary member 1. A gear 41 is mounted for rotation between the plates 39 upon an axle 42 carried by the said plates and the gear 41 meshes with gear 7, and is rotated thereby. The outermost plate 39 has an outstanding stop 43, and a mutilated gear 44 is carried by an axle 45 in turn carried by a supporting plate or bracket 46, which may be part of the casing 8. The gear 44 has a series of teeth 47 to engage the teeth of the gear 7, and a leaf spring 48 secured to and depending from the plate 46 is adapted to press either end tooth 47 when the gear 44 is turned to extreme position in either direction. The gear 44 carries a pin 49 to contact with the stop 43 of the oscillatory plate 39 when the gear 44 is rotated clockwise as seen in Fig. 4, thus holding the plates 39 and gear 41 to the right as seen in Fig. 4. When the plates 39 and the gear 41 are moved to the right, as seen in Fig. 4, the dog 27 is pushed upward out of engagement with the ratchet wheel 6.

The operation is as follows: In starting the automobile, the clutch pedal 3 is depressed to shift gears thus pulling the cord 11 and releasing the dog 9 from the clutch member 5, and said dog 9 will be held out of engagement with the clutch member 5 by the catch 12, and can not be released when the automobile is in motion, due to the striking of the latch wing 26' by the arms of the star wheel 23, as above described. Then, when the automobile moves forward, the gear 41 will swing the plates or props 39 toward the right, thereby maintaining the dog 27 in releasing position. The forward movement of the gear 7 will also rotate the gear 44 through an angle of about 180°, bringing the tooth which is lowermost in Fig. 4 against the free end of the spring 48 while the tooth which is against the spring 48 in Fig. 4 will drag over the teeth of the gear 7, or be supported as hereinafter described. The spring 48 in being pressed by the corresponding end tooth 47 will tend to reverse the gear 44 so that should the gear 7 be rotated reversely, due to the accidental backward movement of the automobile, the reverse rotation of the gear 7 will rotate the gear 41 and throw it and the plates 39 toward the left, as seen in Fig. 3, thereby dropping the dog 27 into engagement with the ratchet wheel 6, and stopping the automobile automatically, before the pin 49 strikes the stop 43. As soon as the automobile again moves forward, the dog 27 is again released from the ratchet wheel 6, and the gear 44 will again rotate counter-clockwise, until the end tooth is again pressed by spring 48 as before the backward movement last described.

When desiring to move backward, the gear shift lever 2 in moving to reverse position will swing the lever 35 and pull the cord 34 to raise the dog 27 and hold it during the backward movement of the vehicle, when the gear 44 in being rotated clockwise by the backward rotation of gear 7 will bring the pin 49 against the stop 43 and, therefore, swing the plates 39 toward the right and hold them in the position seen in Fig. 4, thereby holding the dog 27 in released position during the backward movement of the automobile, thus automatically preventing the dropping of the dog 27 while the machine is in motion. As soon as the backward movement of the vehicle is stopped, the cords 29 and 34 being slackened, and the automobile being again moved forward, the plates or props 39 will remain in position to hold the dog 27 retracted, but the gear 44 will now rotate counter clockwise, thereby removing the pin from the stop 43 to the extreme position occupied thereby before starting the automobile backward as last described above, thus leaving the plates 39 free to swing to the left as seen in Fig. 3, to drop the dog 27 and stop the automobile should it again start to move backward. Thus it will be seen that the action of the dog 27 to stop the backward movement of the automobile is entirely automatic, is in no way under the control of the driver, and can not be operated to stop the machine while running backward, either while the shifting lever 2 is in reverse position, or after it has been withdrawn therefrom.

A modification is shown in Figs. 5 and 6, wherein the dog 27' has a downwardly facing shoulder 27ª, and a gear segment 44' is carried by a shaft 45', the axis of which is stationary. The gear segment 44' engages the gear 7, and has a cam portion 44ª on which the shoulder 27ª seats. When the rotary member 1 rotates forward, the segment 44' is turned to the position F shown in dotted lines in Fig. 5, one end of the segment dragging on the teeth of gear 7, and the cam portion 44ª of the segment gear 44' will raise the dog 27' to releasing position. Should the automobile back up accidentally, the gear segment 44' being rotated clockwise by the gear 7 to the full line position shown in Fig. 5, will drop the dog 27' into engagement with the ratchet wheel 6, and stop the backward movement of the vehicle. But, when the automobile is moved backward intentionally, the gear shift lever 2 in being moved to the reverse position will actuate the lever 35, thus pulling the cord 34 and holding the dog 27' above engagement with the ratchet wheel 6, and the gear segment 44' will be rotated clockwise to the position R shown in dotted lines in Fig. 5, in which position it will remain during the backward movement of the automobile, with the other end of the gear segment 44' dragging on the teeth of gear 7, and the cam portion 44ª will support the dog 27' as long as the automobile runs backward, should the shifting lever 2 be withdrawn from reverse, thus preventing dog 27' from dropping while the car is in backward motion.

When the automobile is again moved forward, the gear segment 44' will be rotated counter clockwise to the position F described above, the teeth of the dog 27' dragging over the teeth of the ratchet wheel 6 as the gear segment 44' passes the full line position shown in Fig. 5. The mechanism will then be ready to again act automatically in preventing the automobile from moving backward accidentally. Thus, the action of dog 27' is always automatic, and it is automatically prevented from stopping the automobile while running backward after having the shifting lever 2 withdrawn from the reverse position while the car is running backward.

In Fig. 6 is illustrated a modification consisting of two gears 50 and 50' rotatable on shafts 51 and 51', respectively, fixed to the gear segment 44' at its opposite edges. The gears 50 and 50' mesh with the gear 7, when the gear segment 44' is rotated to either extreme position, thus preventing either of the corners from dragging on the teeth of gear 7, and preventing friction and noise.

The gears 50 and 50' are intended for use on any or all the gear segments or mutilated gears 44 or 44' of the various forms of back stop.

Having thus described the invention, what is claimed as new is:

1. The combination with a rotary member of a vehicle rotatable when the vehicle is moved, of means for stopping the vehicle, manually operable means for bringing the stopping means into operation, means for concealing the manually operable means having a door, a latch for holding the door closed, and means operated by said member for preventing the releasing of the latch when the vehicle is in motion.

2. The combination with a clutch pedal of a vehicle and a rotary member thereof rotatable when the vehicle is moved, of means for stopping the vehicle, means for moving the stopping means to releasing position when the clutch pedal is moved to throw in the clutch, means for holding the stopping means in releasing position, manually operable means for releasing the holding means, and means operated by said member for preventing the operation of the manually operable means when the vehicle is in motion.

3. The combination with a rotary member of a vehicle rotatable when the vehicle is moved, of a dog for stopping the rotation of said member, means for moving the dog to releasing position, a catch for holding the dog in releasing position, manually operable means operating the catch, and means operated by said member for preventing the operation of the manually operable means when the vehicle is in motion.

4. The combination with a rotary member of a vehicle rotatable when the vehicle is moved, of a dog for stopping the rotation of said member, means for moving the dog to releasing position, a catch for holding the dog in releasing position, manually operable means operating the catch, means for concealing the manually operable means including a door, and means operated by said rotary member for preventing the door from being opened when the vehicle is in motion.

5. Manually operable stopping means for a vehicle, a door preventing access to said means to bring the same in operation, and means for preventing the door from being opened when the vehicle is in motion.

6. Manually operable stopping means for a vehicle, a door for preventing access to said means, a latch for holding the door closed, and a star wheel rotatable when the vehicle is moved for preventing the releasing of the latch.

7. The combination with a rotary member of a vehicle rotatable when the vehicle is moved, of a dog for preventing movement of said member, means for moving the dog to releasing position, a catch for holding the dog in releasing position, manually operable means for moving the catch, means for concealing said manually operable means including a door, a latch for holding the door closed, and a star wheel connected to said member to be rotated thereby and preventing the operation of said latch when the star wheel is rotated.

8. The combination with a rotatable member of a vehicle rotated when the vehicle is moved, of a ratchet wheel and gear carried by said member, a dog movable into engagement with the ratchet wheel to prevent reverse rotation of said member, and means engaging said gear to be operated thereby and constructed and arranged to hold the dog in releasing position when said member is moved forwardly and to also hold the dog in releasing position after it has been moved to such position and said member moved reversely.

9. The combination with a rotatable member of a vehicle rotated when the vehicle is moved, of a ratchet wheel and gear carried by said member, a dog movable into engagement with the ratchet wheel to prevent reverse rotation of said member, and a rocking gear segment engaging said gear to be operated thereby and constructed and arranged to hold the dog in releasing position when said member is moved forwardly and to also hold the dog in releasing position after it has been moved to such position and said member moved reversely.

10. The combination with a rotatable member of a vehicle rotated when the vehicle is moved, of a ratchet wheel and gear carried by said member, a dog movable into engagement with the ratchet wheel to prevent reverse rotation of said member, a rocking gear segment engaging said gear to be operated thereby and constructed and arranged to hold the dog in releasing position when said member is moved forwardly and to also hold the dog in releasing position after it has been moved to such position and said member moved reversely, and gears carried by said gear segment to engage the first named gear in either position of the gear segment.

In testimony that I claim the foregoing as my own, I have hereto affixed my signature in the presence of two witnesses.

LEVI HORNOR.

Witnesses:
H. J. WINDERS,
C. KNOX.

Copies of this patent may be obtained for five cents each, by addressing the "Commissioner of Patents, Washington, D. C."